United States Patent [19]

Kuroki et al.

[11] Patent Number: 4,674,767
[45] Date of Patent: Jun. 23, 1987

[54] AUTOMOTIVE SUSPENSION CONTROL SYSTEM ENSURING RIDING COMFORT AND DRIVING STABILITY, AND ESPECIALLY RIDING COMFORT ON UNDULATING ROADS

[75] Inventors: Junsuke Kuroki; Fukashi Sugasawa, both of Yokohama, Japan

[73] Assignee: Nissan Motor Company, Limited, Kanagawa, Japan

[21] Appl. No.: 751,513

[22] Filed: Jul. 3, 1985

[30] Foreign Application Priority Data

Jul. 4, 1984 [JP] Japan .................. 59-138567

[51] Int. Cl.⁴ .......................... B60G 11/26
[52] U.S. Cl. ................. 280/707; 267/64.16; 280/611; 280/DIG. 1
[58] Field of Search .......... 280/707, DIG. 1, 6 H; 267/64.16

[56] References Cited

U.S. PATENT DOCUMENTS 4,540,188 9/1985 Meloche et al. .............. 280/707

Primary Examiner—John J. Love
Assistant Examiner—Kenneth R. Rice
Attorney, Agent, or Firm—Schwartz, Jeffery, Schwaab, Mack, Blumenthal & Evans

[57] ABSTRACT

A suspension control system includes a road surface sensor which produces a road condition indicative signal. A controller detects bounding and rebounding motions of the vehicle suspension on the basis of the road condition indicative signal from the road sensor. The controller monitors when the bounding and rebounding motion exceeds a predetermined level and when its frequency falls within a given frequency range. These conditions reflect typical vehicle body behavior during travel along an undulating road, in which case, the controller produces a control signal to stiffen the suspension system. This suppresses pitching motion of the vehicle on undulating road so as to satisfactorily and successfully provide good riding comfort.

15 Claims, 17 Drawing Figures

AUTOMOTIVE SUSPENSION CONTROL SYSTEM ENSURING RIDING COMFORT AND DRIVING STABILITY, AND ESPECIALLY RIDING COMFORT ON UNDULATING ROADS

BACKGROUND OF THE INVENTION

The present invention relates generally to a suspension control system for an automotive vehicle, which automatically controls damping characteristics or stiffness of a vehicular suspension depending upon vehicle driving conditions. More specifically, the invention relates to an automotive suspension control system employing a road-condition-dependent suspension control to ensure riding comfort of the vehicle even on an undulating road.

Various uses of road preview sensors have been proposed and developed. For example, SAE Technical Paper Series Nos. 630750 and 800520, respectively published on October, 1968 and February, 1980 show road preview sensors for use in suspension systems for obtaining optimum riding comfort and drivability. In addition, Japanese Patent First Publication No. 57-172808, published on Oct. 23, 1982 discloses a vehicle height control system which includes a sensor which detects rough road conditions and adjusts the vehicle height level depending upon road surface conditions. A vehicle height or level sensor is employed in the disclosed vehicle height control system for monitoring the relative displacement between the vehicle body and wheel axle. The output of the vehicle level sensor is compared with a reference level, which serves as a rough road criterion, and adjusts the vehicle height according to the recognized road surface conditions.

In another example, Japanese Patent First Publication No. 58-30542, published on Feb. 23, 1983, discloses a variable damping force shock absorber with damping characteristics varying in accordance with vehicle driving conditons. In the disclosed system, the magnitude of relative displacement between the vehicle body and wheel axle is measured and a vehicle height variation indicative signal is derived from the measured displacement and the instantaneous vehicle speed. The vehicle height variation indicative signal value is compared with a reference value which serves as a stiff suspension criterion for adjustment of the damping characteristics of the shock absorber in accordance therewith.

On the other hand, Published Japanese Patent Application (Tokkai) Sho. 56-42739 discloses a suspension control system which controls the damping force produced in response to rolling forces depending upon vehicle speed and steering adjustments. The damping force is so controlled as to be HIGH when the vehicle speed is higher than a set speed and the steering adjustments through greater than a predetermined angle are performed. In addition, the owner of the present application has already disclosed a suspension control system in Published Japanese Utility Model Application (Jikkai) Sho. 56-147107. In this system, the damping force produced by a suspension shock absorber is adjusted between HIGH and LOW levels depending upon the vehicle speed, the magnitude of steering adjustments and the angular velocity of steering adjustments.

In these prior art systems, road condition dependent suspension control has been performed with reference to a road surface condition indicative parameter. Such prior art suspension control systems achieve driving stability of the vehicle and riding comfort to some extent. However, in the prior art, it has been difficult to adjust damping characteristics or stiffness of the suspension in precise accordance with the road surface conditions.

SUMMARY OF THE INVENTION

Therefore, it is an object of the invention to provide a suspension control system capable of precisely adapt damping characteristics to the road conditions so as to ensure riding comfort even on undulating roads.

Another object of the invention is to provide a suspension control system can prevent "bottoming" of the vehicular suspension even in response to severe vertical displacements.

In order to accomplish the aforementioned and other objects, a suspension control system, according to the invention, includes a road sensor which produces a road condition indicative signal. A controller recognizes bounding and rebounding motions of the vehicle suspension on the basis of the road condition indicative signal from the road sensor. The controller detects when the bounding and rebounding motion exceeds a predetermined amplitude and has a vibration frequency within a given frequency range. In such cases, the controller produces a control signal ordering stiffer suspension.

The conditions mentioned above are typical of vehicle body behavior during travel over undulating roads. This allows the stiffness or damping characteristics to be adjusted during travel along undulating surfaces so as to suppress pitching motion of the vehicle and so satisfactorily and successfully afford the passengers riding comfort.

According to one aspect of the invention, a suspension control system for a vehicle comprises: a vehicular suspension system with variable damping characteristics, operable in at least a first mode wherein relatively low damping characteristics are obtained and in a second mode wherein relatively high damping characteristics is obtained, a road sensor monitoring road surface conditions and producing a road condition indicative signal, a controller selecting an appropriate operation mode of the suspension on the basis of the road condition indicative signal and producing control signals ordering the suspension system to operate in the selected mode, the controller being responsive to a road condition indicative signal value exceeding a first predetermined threshold value to output a control signal ordering the suspension system to the second mode, the controller detecting when the road condition indicative signal value exceeds a second predetermined threshold which is smaller than the first predetermined threshold and outputting a control signal ordering the suspension system to the second mode when the frequency of occurence of the road condition indicative signal values in excess of the second predetermined threshold exceeds a given frequency threshold.

The controller maintains the suspension system at the second mode for a first given period after ordering the suspension system into the second mode in response to a road condition indicative signal value exceeding the first predetermined value, and for a second given period after ordering the suspension system into the second mode in response to occurrences of the road condition indicative signal value in excess of the second predetermined threshold at frequencies higher than the given frequency threshold.

The first predetermined threshold is selected so as to detect bottoming of the suspension system as the vehicle passes over a bump on the road. The second predetermined threshold is selected so as to detect irregularities in the road surface which may cause uncomfortable pitching motion of the vehicle.

According to another aspect of the invention, a method for controlling damping characteristics of a vehicular suspension system with damping characteristics variable between at least a first harder suspension mode and a second softer suspension mode according to a preselected suspension control parameter, comprising the steps of: monitoring road surface conditions and producing a road surface indicative signal, detecting first road surface conditions in which irregularities of the road surface exceed a predetermined criterion, detecting second road surface conditions in which the road surface undulates to an extent capable of causing uncomfortable pitching motion of the vehicle, and operating the suspension system in the first mode when one of the first and second road surface conditions is detected.

BRIEF DESCRIPTION OF THE DRAWINGS

The present invention will be understood more fully from the detailed description given herebelow and from the accompanying drawings of the preferred embodiments of the invention, which, however, should not be taken to limit the invention to the specific embodiments but are for explanation and understanding only.

The following drawings, throughout which like numerals refer to like elements, may be of assistance in understanding the concepts behind the present invention and the structure, function and purpose of some preferred embodiments thereof:

In the drawings:

FIG. 1 is a perspective view of an automotive vehicle with a typical vehicular suspension system and a first preferred embodiment of a suspension control system in accordance with the present invention;

FIG. 2 is a block diagram of the suspension control system of FIG. 1;

FIG. 3 is a more detailed block diagram of the road sensor of FIG. 3;

FIG. 4 is a flowchart of an road sensor timing control program executed by the controller of FIGS. 2 and 3;

Figure 5:
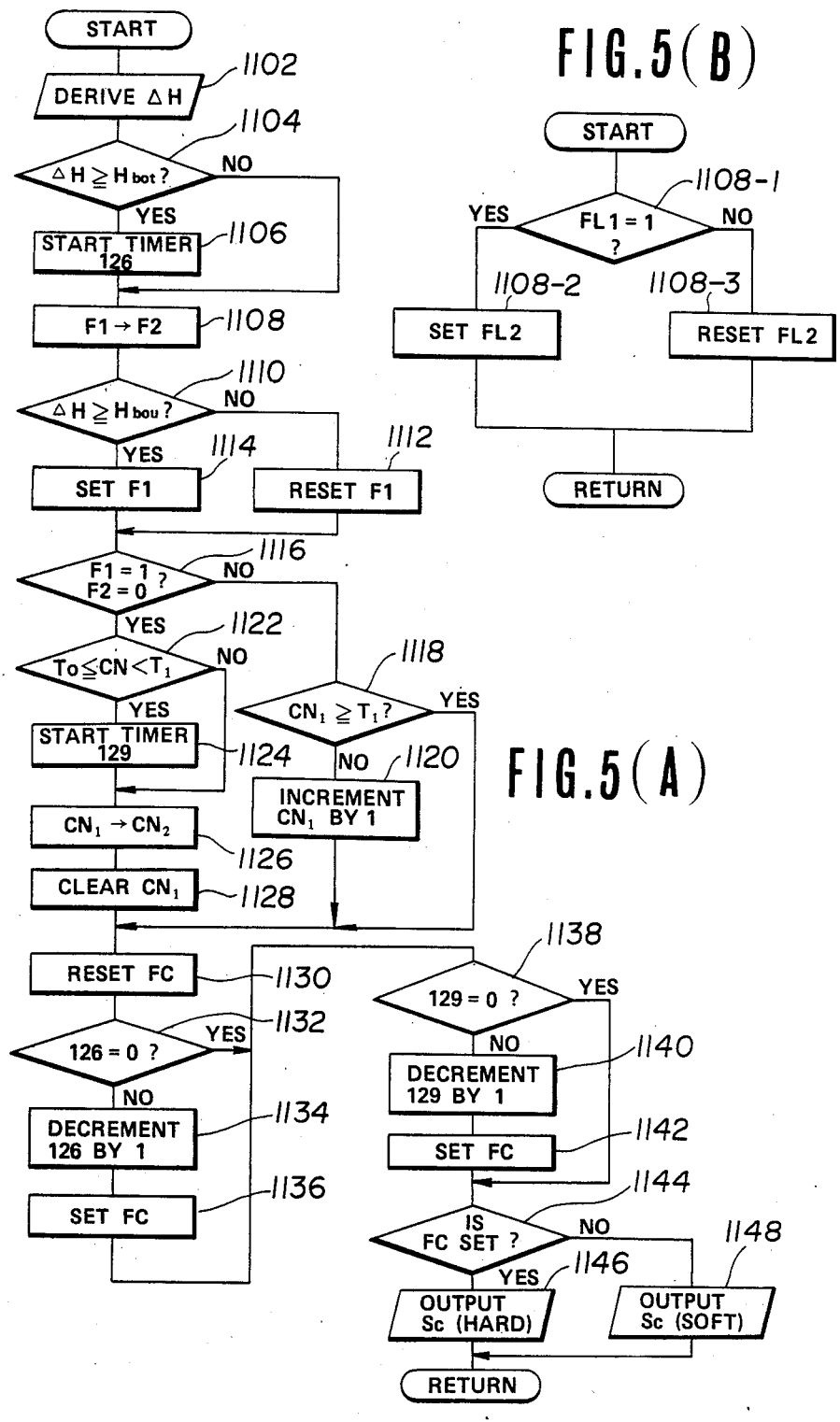
Figure 6:
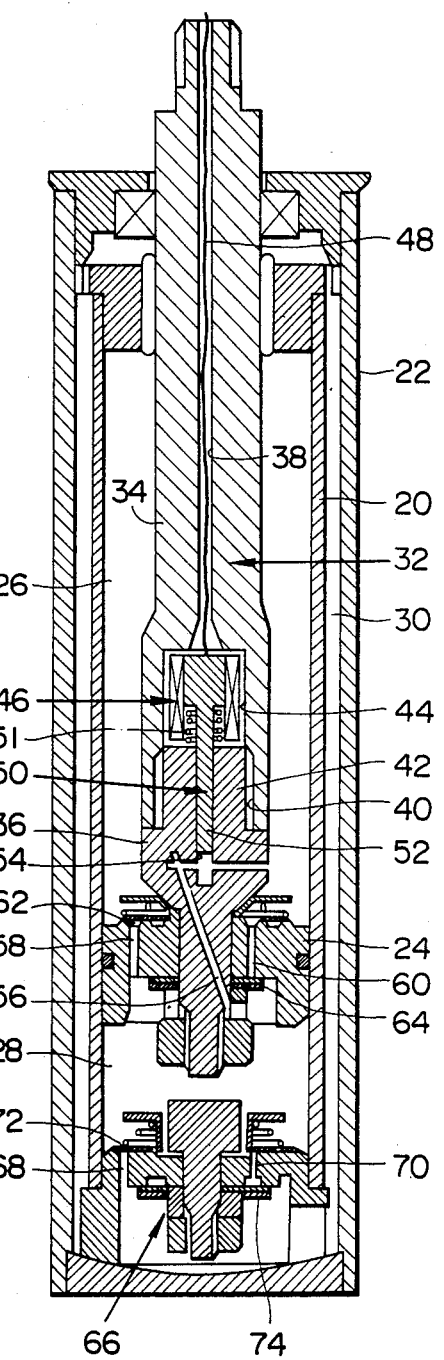
Figure 7:
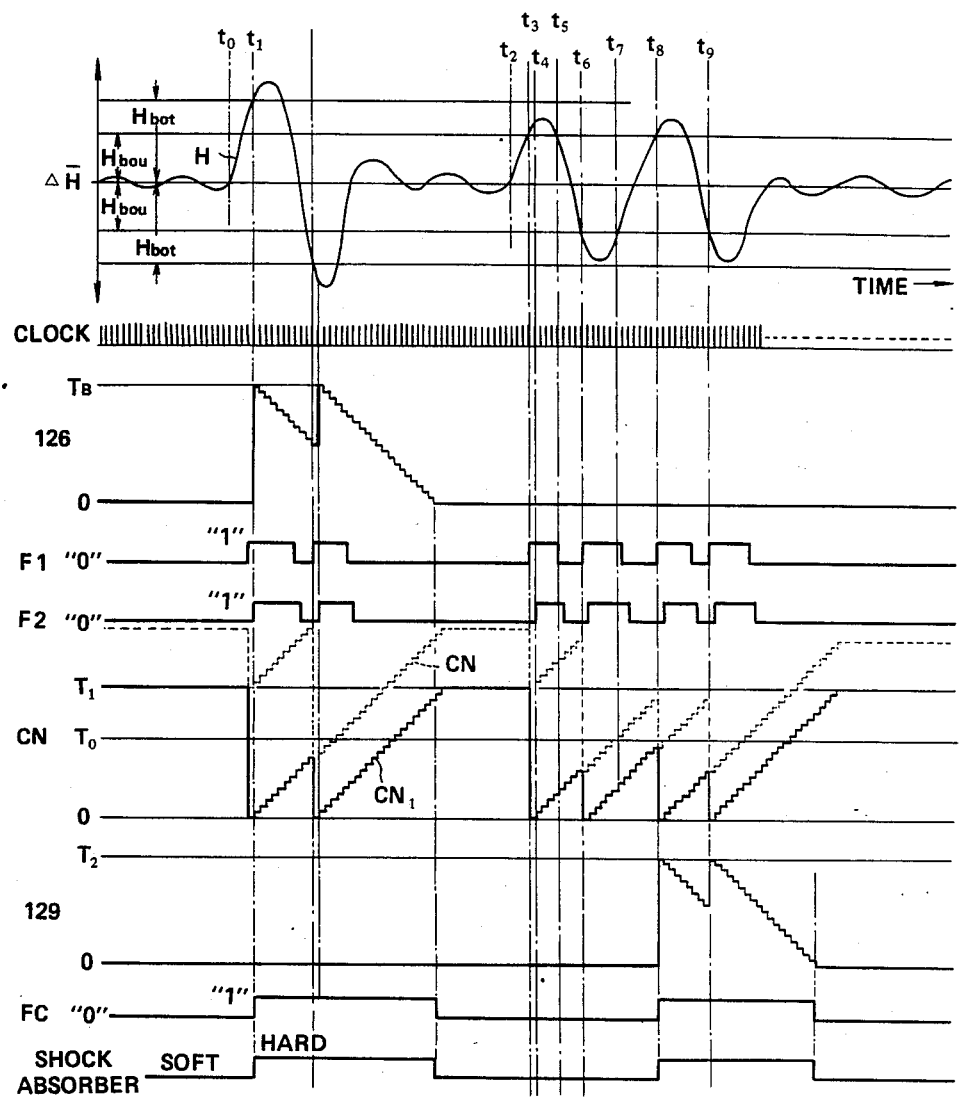
Figure 8:
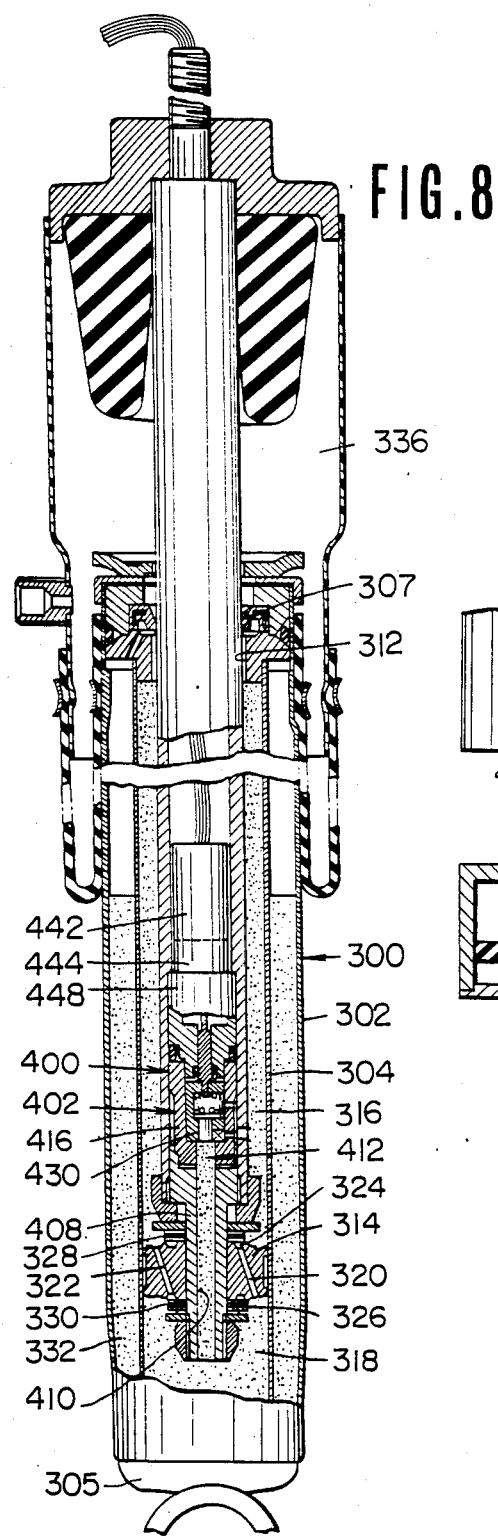
Figure 10:
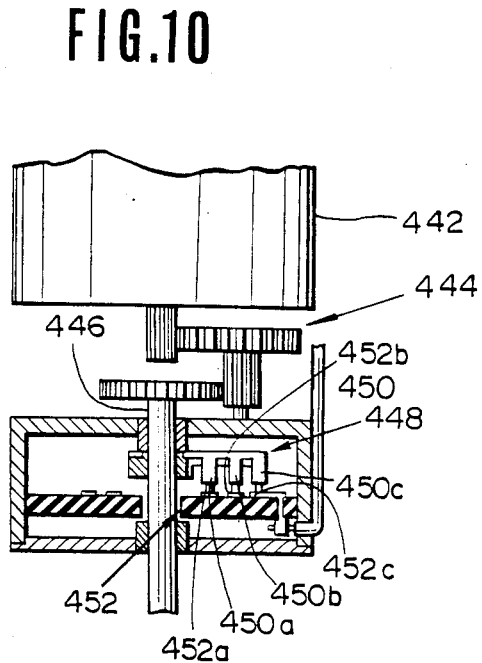
Figure 9:
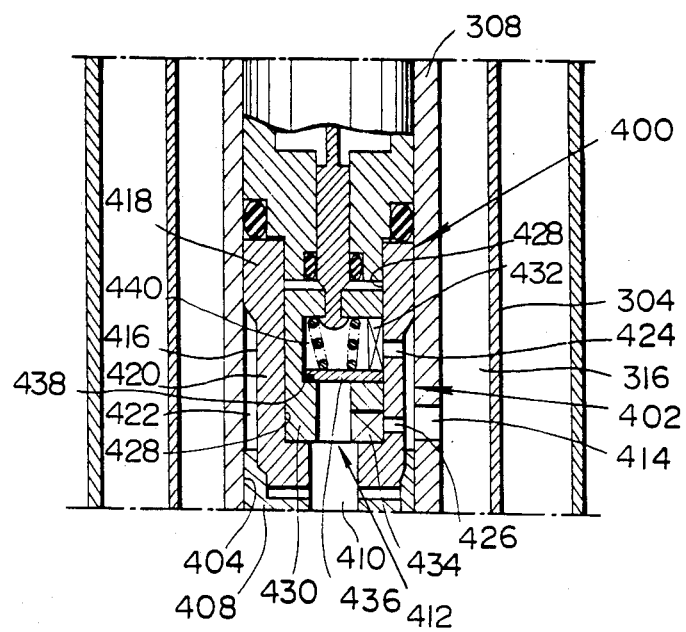
Figure 11A:
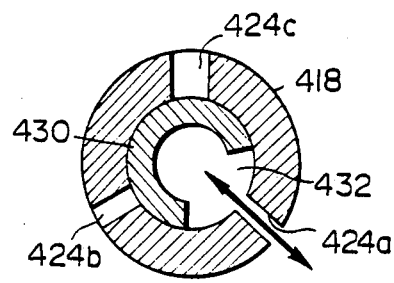
Figure 11B:
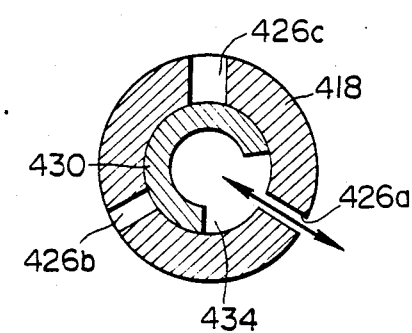
Figure 12:
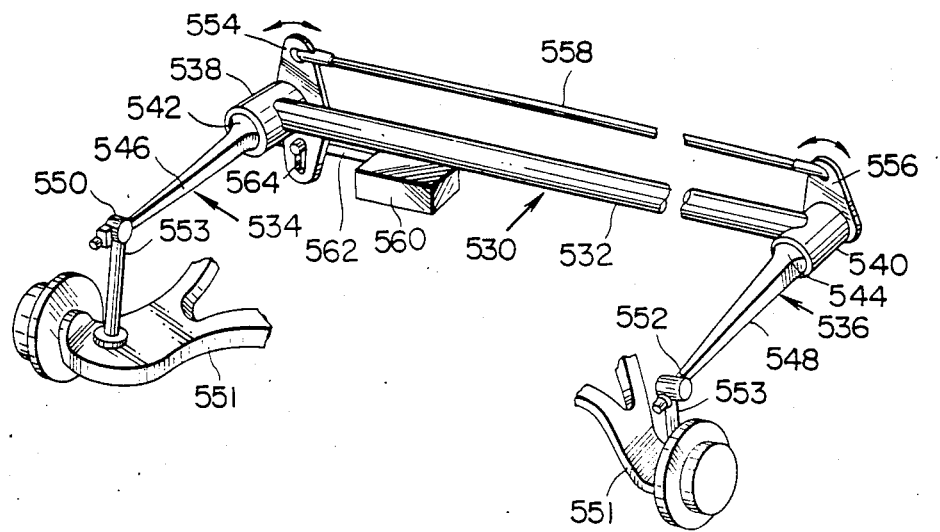
Figure 13:
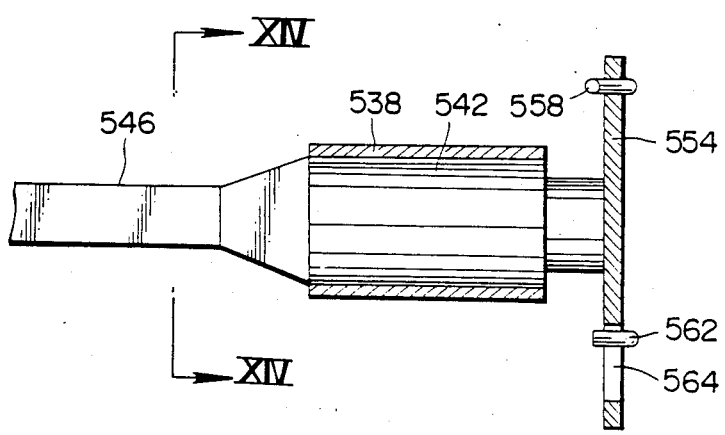
Figure 14:
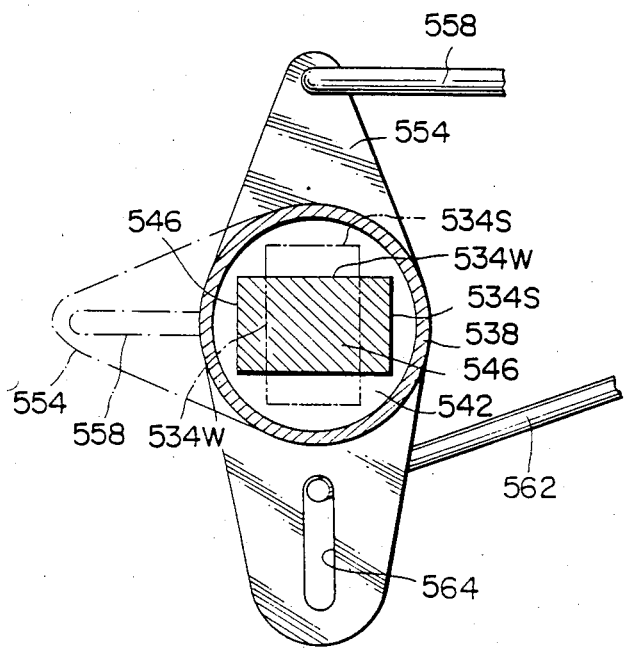

FIGS. 5(A) and 5(B) are flowcharts of a suspension control program to be executed by the first embodiment of suspension control system according to he invention;

FIG. 6 is a longitudinal section through a shock absorber used in the first preferred embodiment;

FIG. 7 is a timing chart showing operation of the first embodiment of the suspension control system;

FIG. 8 is a longitudinal section through a modified shock absorber which is applicable to the first embodiment of the suspension control system of the invention;

FIG. 9 is a partial longitudinal section through a modified shock absorber;

FIG. 10 is an enlarged longitudinal section through the damping force adjusting mechanism of FIG. 9;

FIGS. 11(A) and 11(B) are cross-sections through the mechanism shown in FIG. 9 at positions revealing the three possible fluid flow paths;

FIG. 12 is a fragmentary perspective view of a vehicular roll stabilizer in a suspension system, to which the present invention of a suspension control is applicable;

FIG. 13 is an enlarged side elevation showing major part of the roll stabilizer of FIG. 12;

FIG. 14 is a cross-section taken along line XIV—XIV of FIG. 12; and

Figure 15:
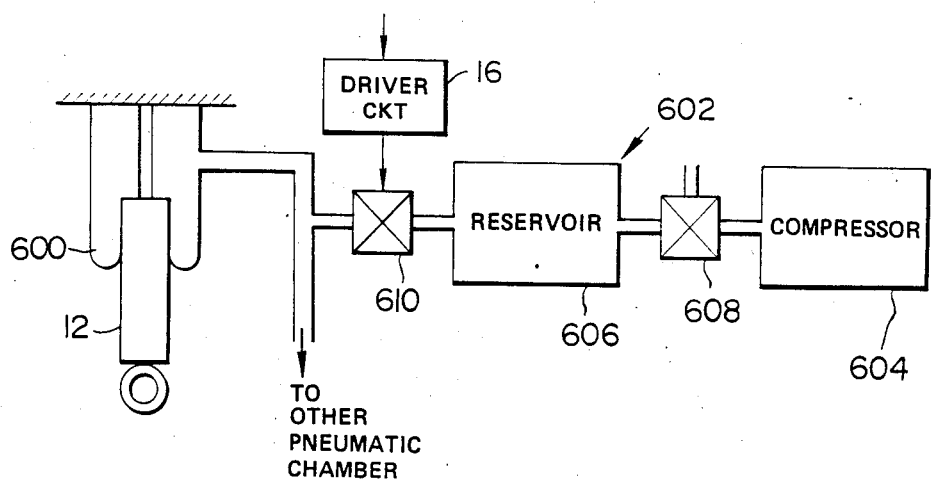

FIG. 15 is a schematic diagram of the third embodiment of a suspension control system in accordance with the present invention.

DESCRIPTION OF THE PRFERRED EMBODIMENTS

Figure 1:
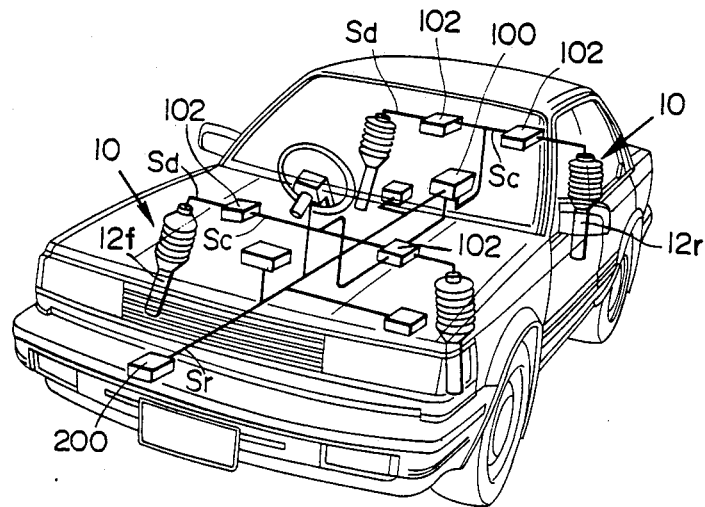

Referring now to the drawings, particularly to FIG. 1, the preferred embodiment of an electronic suspension control system in accordance with the present invention generally comprises front and rear suspension strut assemblies 10, each including a shock absorber 12 with variable shock-absorbing characteristics and a controller 100 adapted to produce a control signal for actuating an actuator (not shown in FIG. 1) in each shock absorber 12 in order to the adjust the shock-absorbing characteristics in accordance with the vehicle driving condition.

In practice, the preferred embodiment of the suspension control system is adapted to operate the actuators of the shock absorbers 12$f$ in the front suspension and the actuators of the shock absorbes 12$r$ in the rear suspension independently of each other. For this, the controller 100 outputs different control signals for independently controlling the actuators of the shock absorbers 12$f$ and 12$r$ independently of each other. The control signal for controlling the actuator of the shock absorber 12$f$ of the front suspension will be referred to hereafter as "front suspension control signal $S_{Fc}$". The control signal for controlling the actuator of the shock absorber 12$r$ of the rear suspension will be referred to hereafter as "rear suspension control signal $S_{Rc}$".

It should be appreciated that the term "shock-absorbing characteristics" used throughout the disclosure refers to the quantitative degree to which a shock absorber produces damping force or spring force against bounding and rebounding motion of the vehicle body as a sprung mass and the road wheel assembly as unsprung mass, and pitching and rolling movement of the vehicle body relative to the road wheel assembly. In practice, the shock-absorbing characteristics can be controlled in various ways based on flow restriction between shock absorber working chambers disposed in shock absorber cylinders. In the shown embodiment, the flow restriction is variable by means of a flow control valve disposed within a reciprocable piston separating the chambers. The preferred embodiment described herebelow employs a shock absorber with two-way variable shock-absorbing characteristics, i.e. HARD mode and SOFT mode. Obviously, in HARD mode, the damping force generated in response to bounding or rebounding shock applied to the vehicle is greater than in SOFT mode. However, the shown embodiment is to be considered merely as an example for facilitating better understanding of the invention and simplification of the disclosure. In fact, shock absorbers which operate in three modes, i.e. HARD mode, SOFT mode and INTERMEDIATE or MEDIUM mode, are also applicable to the preferred embodiment of the suspension control system according to the invention. Some possible modifications to the shock absorber will be disclosed together with the preferred shock absorber design given later.

It should be further noted that, throughout the disclosure, the word "undulating" represents road surface conditions and contours which tend to cause continuous vehicle pitching motion. Also, the term "undulating road" represents a road with undulating contours on the same order of magnitude as the vehicle itself and the word "bump" represents any irregularities in the road surface, such as bumps, manholes projecting from the road surface, pot holes and so forthr, which may cause the vehicle to bounce briefly.

Returning to FIG. 1, the controller 100 is connected to a road surface sensor 200 which produces a sensor signal $S_r$ indicative of road surface conditions, which will be referred to hereinafter as "road sensor signal $S_r$". The controller 100 is also connected to other sensors, such as a vehicle speed sensor, a brake switch, etc., in order to receive the sensor signals indicative of the suspension control parameters. The controller 100 is, in turn, connected to driver signal generators 102 which are responsive to the front and rear control signals $S_{Fc}$ and $S_{Rc}$ from the controller, which control signals $S_{Fc}$ and $S_{Rc}$ can assume either of two states, namely HIGH and LOW. The driver signal generator 102 produces a drive signal $S_d$ hich actuates the shock absorber to one of the HARD and SOFT modes.

The controller 100 uses the road sensor signal $S_r$, variations in which represent irregularities in the road surface and the intensity of pitching of the vehicle, in producing the front and rear control signals $S_{Fc}$ and $S_{Rc}$ which order the shock absorber to switch between HARD mode and SOFT mode. The controller 100 may also use other suspension control parameters, such as vehicle speed, vehicle deceleration and so forth.

Figure 2:
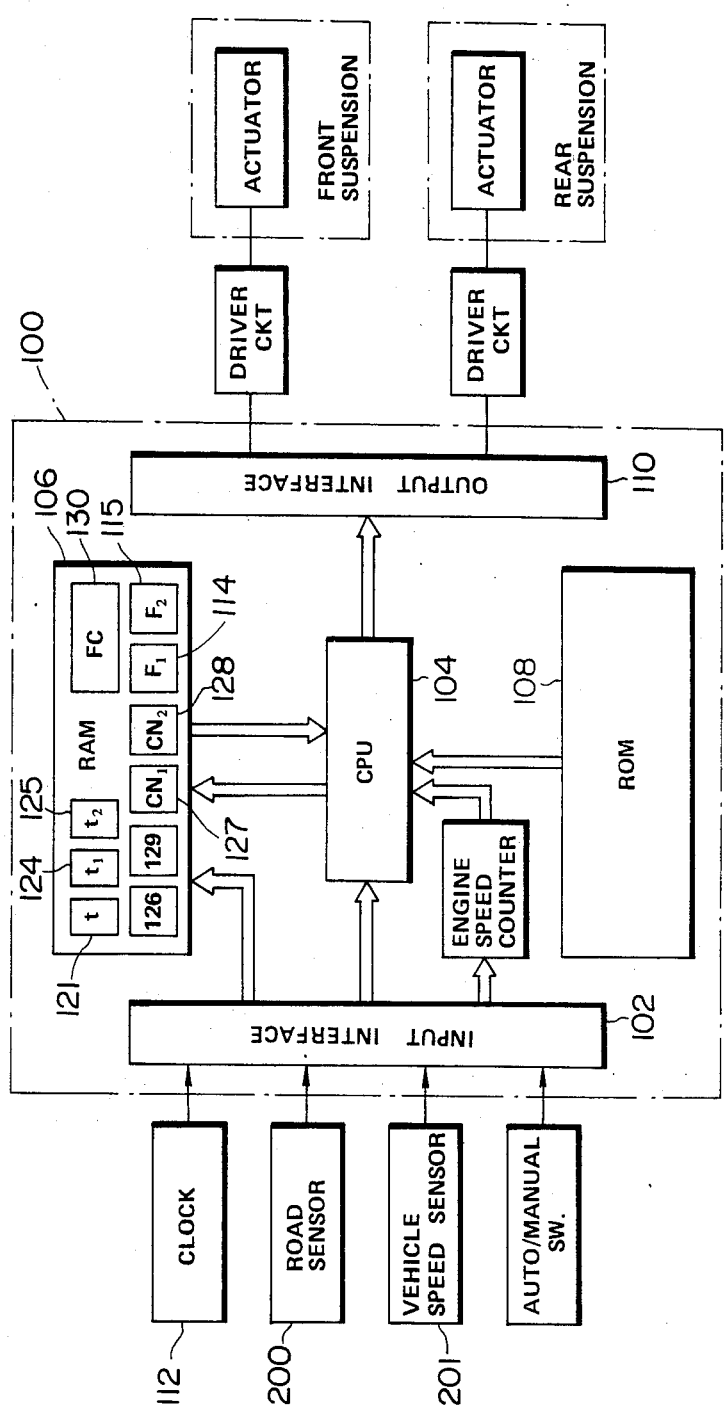

The controller 100 can also be connected to a manually operable switch 202, which is shown in phantom line in FIG. 2, so as to allow manual operation of the control system, which switch will be referred to hereafter as "auto/manual switch". The auto/manual switch 202 may be switched among MANUAL SOFT, MANUAL HARD and AUTO modes. In the MANUAL SOFT and MANUAL HARD modes, damping characteristics of the front and rear suspensions are fixed at the SOFT or HARD respectively mode irrespective of driving conditions.

FIG. 2 shows the preferred first embodiment of the suspension control system including controller 100 which generally comprises a microprocessor. In practice, the microprocessor performs control operations not only depending upon the road surface conditns but also depending upon vehicle speed, other vehicle driving conditions, such as vehicle acceleration, and other preselected suspension control parameters.

The microprocessor 100 generally comprises an input interface 102, CPU 104, RAM 106, ROM 108 and output interface 110. In the shown embodiment, the microprocessor 100 is connected to the road sensor 200 via the input interface 102. The microprocessor 100 is also connected for input from a clock generator 112. The road sensor, in the shown embodiment, comprises an ultra-sonic sensor, construction and operation of which will be described herebelow. The ultra-sonic sensor 200 is associated with the controller 100. The output interface 110 of the microprocessor 100 is connected for output of control signal $S_c$ to each of the driver signal generators.

Figure 3:
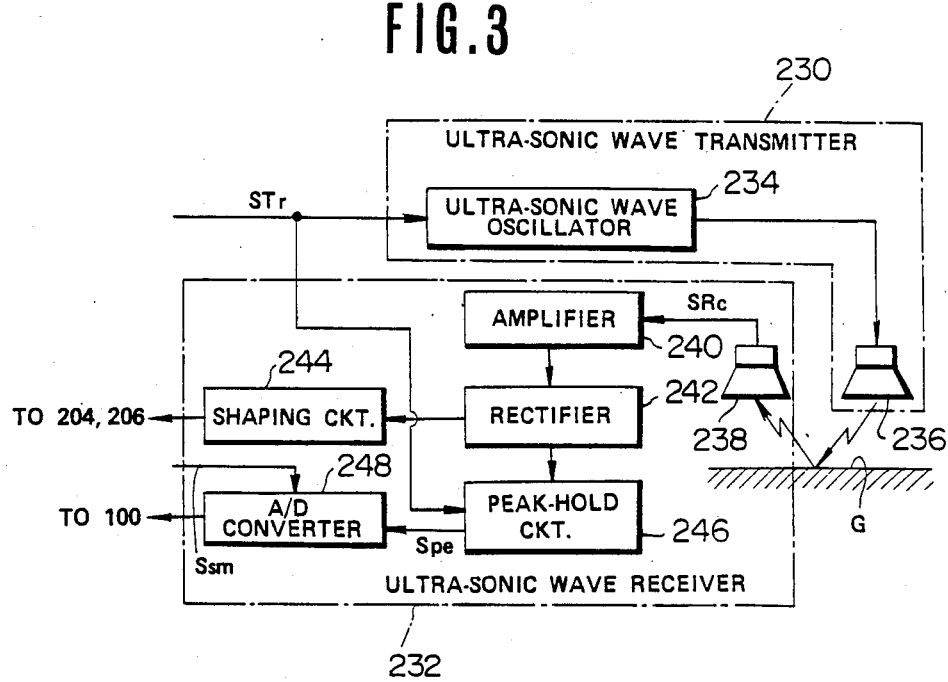

As shown in FIG. 3, the ultra-sonic sensor 202 comprises generally an ultra-sonic wave transmitter 230 and a reflected ultra-sonic wave receiver 232. The transmitter 230 is associated with the controller 100 to receive therefrom a trigger signal $S_{Tr}$ at a given timing. The transmitter 230 includes an ultra-sonic oscillator 234 and an ultra-sonic wave transmitting section 236. The ultra-sonic oscillator 234 is responsive to the trigger signal $S_{Tr}$ from the controller 100, which is issued periodically or intermittently, to transmit or discharge ultra-sonic waves through the transmitter section 236 toward the road surface.

The ultra-sonic waves reflected by the road surface are received by a receiver section 238 of the receiver 232. The receiver section 238 produces a receiver signal $S_{Rc}$ having value varying in accordance with the amplitude of the received ultra-sonic waves. The receiver section 238 is connected to an amplifier 240 to supply the receiver signal $S_{Rc}$ to the latter. The receiver signal $S_{Rc}$ is amplified by the amplifier 240 and transmitted to a rectifier 242. The rectifier 242 is connected to the band-pass filters 204 and 206 as set forth above, through a shaping circuit 244. The rectifier 242 is also connected to a peak-hold circuit 246 which holds the peak value of the receiver signal. The peak-hold circuit 246 produces an analog peak-value-indicative signal $S_{Pc}$ having a value proportional to the held peak value. The peak-hold circuit 246 is connected for output to the controller 100 via an analog-to-digital converter 248. The analog-to-digital converter 248 outputs a binary signal indicative of the peak-value-indicative signal value to the controller 100.

The peak-hold circuit 246 is also connected to the controller 100 to receive the trigger signal $S_{Tr}$. The peak-hold circuit 246 is responsive to the trigger signal from the controller to clear the currently held value.

Figure 4:
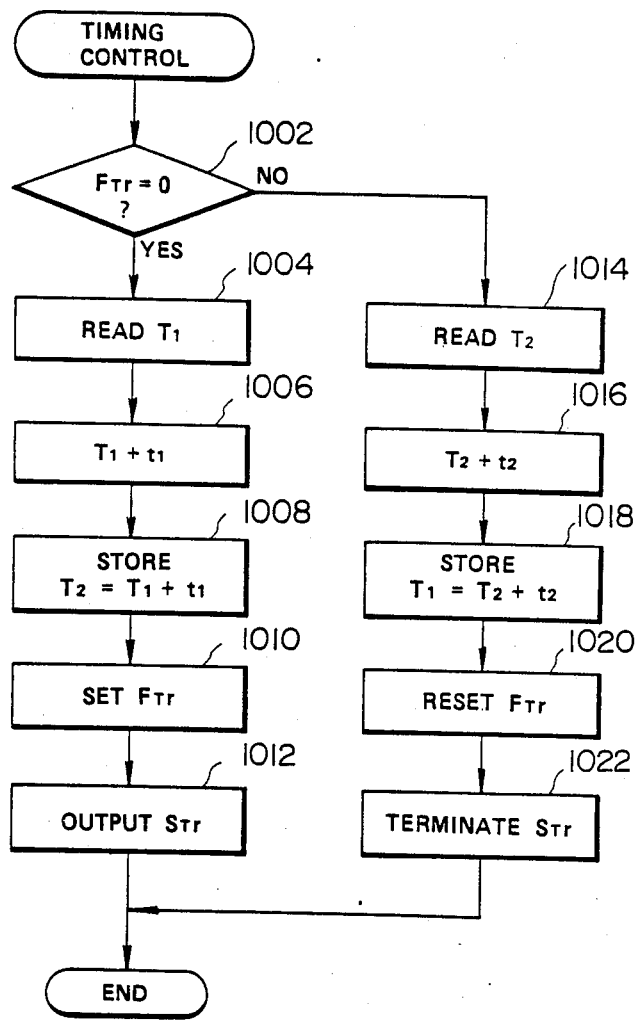

FIG. 4 shows a timing control program executed by the controller 100 for controlling the trigger timing of the ultra-sonic sensor 200.

At the initial stage of execution of the timing control program, a trigger-signal-output-indicative flage $F_{Tr}$ in a memory block 120 of RAM is checked at a step 1002. The trigger signal $F_{Tr}$ is set when the trigger signal is output through the output interface 110 to the transmitter 230 and is reset when the trigger signal is not being output.

If the trigger signal-indicative flage $F_{Tr}$ is set when checked at the step 1002, then the timer value $T_1$ of a timer 122 in RAM is latched at a step 1004. The timer 122 continuously counts clock pulses from the clock generator 112. A trigger-signal-ON-time indicative time value $t_1$ is added to the latched timer value $T_1$ at a step 1006. The resultant value $(T_1+t_1)$, which serves as a trigger-signal-OFF time value, is transferred to and stored in a $T_2$-register 124 in RAM 106, at a step 1008. Then the flag $F_{Tr}$ is set at a step 1010. A HIGH-level output is applied to the output interface as trigger signal $S_{Tr}$ at a step 1012.

During the period $t_1$ starting from the time $T_1$, the potential at the output interface is held HIGH to continue application of the trigger signal $S_{Tr}$ to the transmitter 230. The timer 124 continues counting the clock pulses and produces a $T_1$-timer signal after period $t_1$ which serves as a trigger signal for the timing control program.

In response to the $T_1$-timer signal at time $T_2$ marking the end of the period $t_1$, the timing control program is executed again. Since the trigger signal-indicative flag $F_{Tr}$ was set at the step 1010 in the previous cycle of program execution, the answer at the step 1002 becomes "NO". Thus, control passes to a step 1014 in which the timer value $T_2$ of the second timer 125 is accessed in RAM 106. Similarly to the first-mentioned timer 124, the timer 125 continuously counts clock pulses from the clock generator 112. An OFF-interval-indicative time data $t_2$ is added to the latched timer value $T_2$ at a step 1016. The time data $t_2$ has a value corresponding to a predetermined interval between successive trigger signals. The resultant time value $(T_2+t_2)$ is stored in the $T_1$-timer 124 of RAM 106 at a step 1018. Then, the flag $F_{Tr}$ is reset at a step 1020. After the step 1020, the output level at the output interface drops to LOW to terminate transmission of the trigger signal to the transmitter, at a step 1022.

The detailed structure and operation of the aforementioned preferred embodiment of the ultra-sonic sensor has been disclosed in the co-pending U.S. patent application Ser. No. 650,705, filed Sept. 14, 1984. The disclosure of the above-identified U.S. patent application Ser. No. 650,705 is hereby incorporated by reference for the sake of disclosure.

FIG. 6 shows the detailed structure of a variable-damping-force shock absorber 12 employed in the first embodiment of the suspension control system according to the present invention. The shock absorber 12 generally comprises inner and outer hollow cylinders 20 and 22 arranged coaxially, and a piston 24 fitting flush within the hollow interior of the inner cylinder 20. The piston 24 defines upper and lower fluid chambers 26 and 28 within the inner cylinder 20. The inner and outer cylinders define an annular fluid reservoir chamber 30.

The piston 24 is connected to the vehicle body (not shown) by means of a piston rod which is generally referred to by the reference number 32. The piston rod 32 comprises upper and lower segments 34 and 36. The upper segment 34 is formed with an axially extending through opening 38. The lower end of the through opening 38 opens into a recess 40 defined on the lower end of the upper segment 34. On the other hand, the lower segment 36 has an upper section 42 engageable to the recess 40 to define therein a hollow space 44. An actuator is disposed within the space 44. The actuator 46 is connected to the driver circuit 16 through a lead 48 extending through the through opening 38. The actuator 46 is associated with a movable valve body 50 which has a lower end extension 52 inserted into a guide opening 54 defined in the lower segment 36. The guide opening 54 extends across a fluid passage 56 defined through the lower segment 36 for fluid communication between the upper and lower fluid chambers 26 and 28.

The fluid passage 56 serves as a bypass for flow-restrictive fluid passages 58 and 60 formed in the piston 24. The upper end of the fluid passage 58 is closed by a resilient flow-restricting valve 62. Similarly, the lower end of the fluid passage 60 is closed by a flow-restricting valve 64. The flow-restricting valve 62 and 64 serve as check valves for establishing one-way fluid communication in opposite directions. In addition, since the flow-restriction valves 62 and 64 are biased toward the ends of the fluid passages 58 and 60, they open to allow fluid communication between the upper and lower fluid chambers 26 and 28 only when the fluid pressure difference between the upper and lower chambers 26 and 28 overcomes the effective pressure of the valves.

The cross-sectional area of the fluid passages 58 and 60 and the set pressures of the fluid-restriction valves 60 and 62 determine the damping force produced in HIGH damping force mode. The cross-sectional area of the fluid passage 56 determines the drop in the damping force in the LOW damping force mode in comparison with that in the HIGH damping force mode.

The movable valve body 50 is normally biased upwards by means of a coil spring 51. As a result, when the actuator 46 is not energized, the lower end section 52 of the valve body 50 is separated from the fluid passage 56 to allow fluid communication between the upper and lower chamber. When the actuator 46 is energized, the valve body 50 moves downwards against the resilient force of the coil spring 51 to block the fluid pasage 56 with the lower end extension 52. As a result, fluid communication between the upper and lower fluid chambers 26 and 28 via the fluid passage 56 is blocked. When fluid communication through the fluid passage is permitted, the damping force produced by the shock absorber 14 remains LOW. On the lower hand, when the fluid passage 56 is shut, fluid flow rate is reduced, thus increasing the damping force produced. Therefore, when the valve body 50 is shifted to the lowered position, the shock absorber works in HIGH damping force mode to produce a higher damping force against vertical shocks.

A bottom valve 66 is installed between the lower fluid chamber 28 and the fluid reservoir chamber 30. The bottom valve 66 is secured to the lower end of the inner cylinder and includes fluid passages 68 and 70. The upper end of the fluid passage 68 is closed by a flow-restriction valve 72. The lower end of the fluid passage 70 is closed by a flow-restriction valve 74.

In the normal state wherein the control signal of the controller 100 remains LOW, the movable valve body 50 is held in its upper position by the effect of the spring force 51 so that the lower end extension 52 does not project into the fluid passage 56. Therefore, the fluid communication is established through both the fluid passage 56 and the applicable one of the flow-restricting fluid passages 58 and 60. As a result, the total flow restriction is relatively weak to allow the shock absorber to operate in SOFT mode.

In response to a HIGH-level control signal from the controller 100, the driver signal generator 102 corresponding to each shock absorber 12 becomes active to energize the actuator 46. The actuator 46 drives the movable valve body 50 downward. This downward movement shifts the lower end of the extension 52 of the valve body 50 into the fluid passage 56 so as to block fluid communication between the upper and lower fluid chambers 26 and 28 via the fluid passage 56. Therefore, the fluid can flow between the upper and lower chambers 26 and 28 only through one of the fluid passages 58 and 60. The fluid flow restriction is, thus, increased, resulting in a greater damping force than is produced in the SOFT mode. In other words, the shock absorber 12 operates in HARD mode.

Operation of the aforementioned first embodiment of the suspension control system in accordance with the present invention will be described herebelow with reference FIGS. 5(A) and 5(B).

FIG. 5(A) shows a suspension control program to be cyclically executed at a predetermined timing. In practice, the shown suspension control program is executed at every 20 msec., for example. Immediately after starting execution, the instantaneous value H of the road sensor signal Sr, which is representative of the height of the vehicle above the road surface, is read at a step 1102 and used to derive a weighted average value $H_{ave}$ on the basis of the road sensor signal value stored in a memory block SR in RAM of the controller.

In practice, average value $H_{ave}$ of the road sensor signal value H is calculated by updating the previous average with a value derived from the instantaneous road sensor signal value H according to the following equation:

$$H_{ave} = H_{ave0} + 1/64 \cdot (H - H_{ave0})$$

where $H_{ave0}$ is the average value of the road sensor signal value derived in the immediately preceding cycle of program execution.

Then, an absolute difference value $\Delta H \ (= |H_{ave} - H|)$ is calculated in step 1102. In the next step 1104, the derived absolute value $\Delta H$ is compared with a predetermined bottoming threshold $H_{bot}$. If the difference $\Delta H$ is less than the bottoming threshold $H_{bot}$ when compared in the step 1104, the routine jumps to a step 1108, in which a bouncing indicative flag F2 is set or reset in a flag register 115 in RAM 106 depending on the status of another bounding indicative flag F1 which is held in a flag register 114 in RAM. The routine to set/reset the bounding indicative flag F1 is shown in FIG. 5B. In the F1 set/reset routine, at a step 1108-1, the bounding flag F1 is checked to see whether or not it is set. If the flag F1 is set the bounding indicative flag F2 is set at a step 1108-2. On the other hand, if the bouncing indicative flag F1 is not set the bouncing indicative flag F2 is reset at a step 1108-3.

On the other hand, if the difference $\Delta H$ is equal to or greater than the bottoming threshold $H_{bot}$, a timer 126 is started at a step 1106. The timer 126 counts clock pulses from the clock generator 112 until its counter value reaches a given value. After starting the timer 126 at the step 1106, control passes to the step 1108 described above.

The value of the bottoming threshold $H_{bot}$ is so determined as to allow detection of vibrations transmitted through the vehicular wheels due to irregularities in the road surface sufficiently severe to degrade riding comfort. That is, significant vehicle body vibration is anticipated when the difference $\Delta H$ is greater than the bottoming threshold $H_{bot}$.

Then, the difference $\Delta H$ is compared with a predetermined bouncing threshold $H_{bou}$ at a step 1110. If the difference $\Delta H$ is less than the bouncing threshold $H_{bou}$, the bouncing indicative flag F1 is reset at a step 1112. On the other hand, if the difference $\Delta H$ is equal to or greater than the bouncing threshold $H_{bou}$, the bounding indicative flag F1 is set at a step 1114. After the steps 1112 and 1114, the status of the bounding indicative flags F1 and F2 are checked to see whether they are set or reset at a step 1116.

The bouncing threshold value $H_{bou}$ is so determined as to allow detection of relatively small-amplitude vehicle body vibrations due to undulating road surfaces which affect riding comfort.

In the step 1116, the program checks to see if the bounding indicative flag F1 is set and the bouncing indicative flag F2 is reset. If either the flag F1 is reset or the flag F2 is set, a counter value $CN_1$ of a counter 127 is compared with a reference value T1 at a step 1118. If the counter value is equal to or greater than the reference value T1, control passes to a step 1130. On the other hand, if the counter value $CN_1$ is less than the reference value T1, the counter value $CN_1$ of the counter 127 is incremented by one at a step 1120. After the step 1120, control passes to the step 1130.

If the flag F1 is set and the flag F2 is reset when checked at the step 1116, the sum CN of the counter value $CN_1$ of the counter 127 and a counter value $CN_2$ of a counter 128 is derived at a step 1122 and the program checks to see if the sum CN is equal to or greater than a reference value T0 and less than the reference value T1. If not, control passes to a step 1126. Otherwise, another bouncing timer 126 is started at a step 1124, and control then passes to the step 1126.

It should be appreciated that the reference value T1 is determined so as to allow detection of a specific range of period of continuous vehicle body vibration, which range of vehicle body vibration approximates the resonant frequency of the vehicle body.

In the step 1126, the counter value $CN_1$ of the counter 122 is loaded into the counter 128 as an initial counter value $CN_2$. Thereafter, the counter value $CN_1$ of the counter 127 is cleared to zero at a step 1128. Thereafter, the routine goes to the step 1130.

In the step 1130, a control state indicative flag FC held in a flag register 130 in RAM 106 is reset. Then, the timer value t3 of the timer 126 is compared to a predetermined time-up threshold $T_{ref1}$ at a step 1132. If time has expired when checked at the step 1132, the routine goes to a step 1138. Otherwise, the timer value t3 of the timer 126 is decremented by 1 at a step 1134. The control state indicative flag FC is then set at a step 1136.

In the step 1138, the timer value t4 of the timer 129 is compared to a predetermined time-up threshold $T_{ref}$. If time has expired at the step 1138, control passes to a step 1144. Otherwise, the timer value t4 of the timer 129 is decremented by 1 at a step 1140. Thereafter, the control state indicative flag FC is set at a step 1142.

In the step 1144, the control state indicative flag FC is checked to see whether it is set. If so, a control signal Sc ordering the shock absorber to the HARD mode position is output at a step 1146. Otherwise, a control signal Sc ordering the shock absorber to the SOFT mode is output at a step 1148.

The practical operation of the above first embodiment of the suspension control system will be described hereafter with reference to FIG. 7.

As the vehicle travels along an essentially smooth road, the amplitude of vibrations transmitted through the vehicle wheels is relatively small. The difference value $\Delta H$ derived in the step 1104 is relatively small and thus smaller than the bottoming threshold $H_{bot}$. As a result, the timer 126 is not started in the step 1106. Furthermore, since the difference $\Delta H$ is also smaller than the bouncing threshold $H_{bou}$ when checked at the step 1110, the bouncing state indicative flag F1 is reset at the step 1112. Since the flag F1 is reset at the step 1112, the step 1124 is skipped, i.e., the timer 129 is not started, and the counter value $CN_1$ is incremented at step 1120 until it reaches the value $T_1$. Therefore, time-up is detected at the steps 1132 and 1138. As a result, the steps 1136 and 1142 are skipped, so that the control state indicative flag FC remains reset. Therefore, the control signal ordering SOFT mode of the shock absorber is output at the step 1148.

On the other hand, when the vehicle passes over a bump or a manhole cover projecting from the road surface, imparting a relatively strong impulse to the vehicle, and assuming the vehicle hits the bump at time t0, the road sensor signal value H varies significantly so that the difference $\Delta H$ becomes equal to or greater than the bottoming threshold $H_{bot}$. Thus, at time t1, the difference $\Delta H$ exceeds the bottoming threshold $H_{bot}$ and this is detected at the step 1104. Therefore, the timer 126 is started at the step 1106. At the same time, the difference $\Delta H$ exceeds the bouncing threshold $H_{bou}$ as detected at the step 1110. Therefore, the bouncing indicative flag F1 is set at the step 1114. At this time, the bouncing indicative flag F2 remains reset. Therefore, the counter value $CN_1$ remains at T1 and the counter value $CN_2$ remains at zero. Therefore, the sum CN is equal to or greater than the threshold value T1. Therefore, the timer 126 is not started at a step 1122.

At this time, the timer value $t_3$ of the timer 126 is non-zero, the control state indicative flag FC is set at the step 1134. Therefore, at the time t1, the control signal ordering the shock absorber to HARD mode is output at the step 1144.

The shock absorber remains in HARD mode over a period of time corresponding to a preset value of the timer 126.

On the other hand, as the vehicle travels along an undulating road without surface irregularities which would immediately trigger HARD mode operation of the shock absorber, and assuming the vehicle enters the undulating road at a time t2, the difference ΔH becomes equal to or greater than the bouncing threshold $H_{bou}$ at the time t3. Therefore, the flag F1 is set at the step 1114. At the time, since the sum CN of the counter values $CN_1$ and $CN_2$ is equal to or greater than T1, the timer 129 is not started. At the same time, the counter value $CN_2$ is set to the value of the counter value $CN_1$ at step 1126 and the counter value $CN_1$ is cleared. Since both of the timer values remain zero, the control signal ordering SOFT mode of the shock absorber is output.

In the next cycle of program execution, which is performed at a time t4, the flag F2 is set at the step 1108. Therefore, since in this case the counter value $CN_1$ remains smaller than the threshold value T1, the counter value $CN_1$ is incremented by 1 at the step 1120. However, the timer 129 still is not started and thus the control signal ordering the SOFT mode of the shock absorber is output at the step 1146.

At a time t5, difference ΔH drops below the bounding threshold $H_{bou}$. Therefore, the flag F1 is reset at a step 1112. Thereafter, as the vehicle continues to drop, the absolute difference ΔH again become greater than the bouncing threshold $H_{bou}$ at a time t6. Therefore, the flag F1 is again set at the step 1114, the counter value $CN_2$ is set to the value of the counter value $CN_1$ and, thereafter, the counter value $CN_1$ is cleared. At a time t7, the sum CN of the counter values $CN_1$ and $CN_2$ become equal to or greater than the threshold value T0 while remaining smaller than the threshold value T1. Therefore, at a time t8 at which the difference ΔH again exceeds the bouncing threshold $H_{bou}$, the flag F1 is set and the flag F2 is reset. As can be seen in FIG. 7, at this time, the sum value CN is greater than T0 and smaller than T1. Therefore, the timer 129 is started. As a result, the timer value of the timer 129 is greater than zero when checked at the step 1136. Therefore, the control signal ordering HARD mode of the shock absorber is produced at the step 1144.

The counter value $CN_1$ is cleared to zero at the step 1126, at the time t8. Therefore, at a time t9 at which the difference ΔH again exceeds the bouncing threshold $H_{bou}$, the timer 129 is again started to renew the period for which the shock absorber operates in HARD mode. This renewal of the timer 129 is repeated as long as the vehicle travels along the undulating road which would otherwise cause uncomfortable pitching motion of the vehicle.

Although the first embodiment of the suspension control system discussed above employs two-way shock absorbers, it would be possible to employ shock absorbers with damping characteristics adjustable to more than two states. For example, three-way shock absorbers, i.e. HARD mode, MEDIUM mode and SOFT mode, may be used in the first embodiment of the suspension control system. FIGS. 8 to 11 show such a modification to the variable-damping-characteristic shock absorber of FIG. 6. In this modification, the shock absorber 12 can be operated in any of three modes, namely HARD mode, SOFT mode and MEDIUM mode, in the last of which damping characteristics intermediate to those of HARD mode and SOFT mode are achieved.

The hydraulic shock absorber 12 has coaxial inner and outer cylinders 302 and 304. Top and bottom ends of the cylinders 302 and 304 are plugged with fittings 306 and 305. The fitting 306 includes a seal 307 which establishes a liquid-tight seal. A piston rod 308 extends through an opening 312 formed in the fitting 306 and is rigidly connected to a vehicle body (not shown) at its top end. The piston rod 308 is, in turn, connected to a piston 314 reciprocally housed within the inner cylinder 302 and defining upper and lower fluid chambers 316 and 318 therein.

The piston 314 has fluid passages 320 and 322 connecting the upper and lower fluid chambers 316 and 318. The piston 214 also has annular grooves 324 and 326 along its upper and lower surfaces concentric about its axis. The upper end of the fluid passage 320 opens into the groove 324. On the other hand, the lower end of the fluid passage 322 opens into the groove 326. Upper and lower check valves 328 and 330 are provided opposite the grooves 324 and 326 respectively to close the grooves when in their closed positions. The lower end of the fluid passage 320 opens onto the lower surface of the piston at a point outside of the check valve 330. Likewise the upper end of the fluid passage 322 opens onto the upper surface of the piston at a point outside of the check valve 328.

Therefore, the fluid passage 322 is active during the piston expansion stroke, i.e. during rebound of the shock absorber. At this time, the check valve 323 prevents fluid flow through the fluid passage 320. On the other hand, during the piston compression stroke, i.e. during bounding movement of the suspension, the fluid passage 320 is active, allowing fluid flow from the lower fluid chamber 318 to the upper fluid chamber 316 and the fluid passage 322 is blocked by the check valve 330.

The piston rod 308 has a hollow cylindrical shape so that a damping force adjusting mechanism, which will be referred to generally by the reference numeral "400" hereafter, can be housed therein. The damping force adjusting mechanism 400 includes a valve mechanism 402 for adjusting the cross-sectional area through which the working fluid can flow between the upper and lower chambers. In the preferred embodiment, the valve mechanism 402 allows three steps of variation of the damping force, i.e., HARD mode, MEDIUM mode and SOFT mode, the narrowest cross-sectional area representing the HARD mode, the widest the SOFT mode and intermediate the MEDIUM mode. Although the preferred embodiment of the invention will be described hereafter in terms of a three-way, adjustable-damping-force shock absorber, the number of adjustable positions of the shock absorber may be increased or decreased as desired and is not limited to this example.

As shown in FIG. 9, the piston rod 308 defines an axially extending through opening 404 with the lower end opening into the fluid chamber 318. A fitting 408 seals the lower end of the opening 404 of the piston rod and has axially extending through opening 410, the axis of which is parallel to the axis of the through opening 404 of the piston rod. Thus, the through opening 404 and 410 constitute a fluid path 412 extending through the piston rod. The piston rod 308 also has one or more radially extending orifices or openings 414 opening into the upper fluid chamber 316. Thus, the upper and lower fluid chambers 316 and 318 are in communication throuth the fluid path 412 and the radial orifices 414.

A stationary valve member 416 with a flaring upper end 418 is inserted into the through opening 404 of the piston rod. The outer periphery of the flaring end 418 of the stationary valve member 416 is in sealing contact with the internal periphery of the through opening. The stationary valve member 416 has a portion 420 with a smaller diameter than that of the upper end 418 and so as to define an annular chamber 422 in conjunction with the inner periphery of the through opening 404 of the piston rod. The stationary valve member 416 has two sets of radially extending orifices 424 and 426 and an internal space 428. The radially extending orifices 424 and 426 establish communication between the internal space 428 and the annular chamber 422. A movable or rotary valve member 430 is disposed within the internal space 428 of the stationary valve member 416. The outer periphery of the rotary valve member 430 slidingly and sealingly contacts the inner surface of the stationary valve member 416 to establish a liquid-tight seal therebetween. Radially extending orifices 432 and 434 are defined in the rotary valve member 430 at positions opposite the orifices 424 and 426 of the stationary valve member 416.

As shown in FIGS. 11(A) and 11(B), the orifices 424 and 426 respectively include first, second and third orifices 424a, 424b, 424c, and 426a, 426b, and 426c. The first orifices 424a and 426b have the narrowest cross-sections and the orifices 432 and 434 are adapted to be in alignment with the first orifices s to establish fluid communication between the upper and lower fluid chambers 316 and 318 in the case of the HARD mode. The third orifices 424c and 426c have the widest cross-sections and the orifices 432 and 434 are adapted to be in alignment with the third orifices in the case of the SOFT mode. The cross-sections of the second orifices 424b and 426c are intermediate those of the first and third orifices and the orifices 432 and 434 are adapted to align therewith in the case of the MEDIUM mode.

A check valve 436 is provided within an internal space of the rotary valve member 430. The check valve 436 is normally biased towards a valve seat 438 by means of a bias spring 440 for allowing one-way fluid flow from the lower fluid chamber to the upper fluid chamber. This cause the bound damping force to be somewhat weaker than the rebound damping force.

The rotary valve member 430 is associated with an electrically operable actuator such as an electrical step motor 442 through a differential gear unit 444 and an output shaft 446 as shown in FIG. 11. A potentiometer 448 is associated with the output shaft 446. The potentiometer 448 includes a movable contact 450 with contactors 450a, 450b and 450c. The contactors 450a, 450b and 450c are adapted to slidingly contact stationary contact elements 452a, 452b and 452c of a stationary contact 452. According to the electrical connections between the movable contact and the stationary contact, the potentimeter 448 produces a mode signal representative of the rotary valve position and thus indicative of the selected mode of the damping force adjusting mechanism. The step motor 442 is electrically connected to a controller 100 to receive the control signal as a mode selector signal which drive the motor 442 through an angle corresponding to the rotary valve movement to the corresponding valve position. In this case, the potentiometer will return the mode signal as a feedback signal to indicate the instantaneous valve position.

It should be appreciated that the controller 100 may be operated either in automatic mode or in manual mode.

Returning to FIG. 8, the shock absorber has a fluid reservoir chamber 332 between its inner and outer cylinders 302 and 304, which fluid reservoir chamber 332 is in communication with the lower fluid chamber 318 via the bottom fitting 305 described previously. The bottom fitting 305 may serve to produce damping force in cooperation with the piston and the damping force adjusting mechanism during bounding and rebounding motion of the vehicle. A relatively low pressure pneumatic chamber 336 is also defined between the inner and outer cylinders 302 and 304.

The operation of the damping force adjusting mechanism 400 will be briefly described herebelow with reference to FIGS. 11. FIGS. 11(A) and 11(B) show the case of the HARD mode. In this case, the orifice 432 of the rotary valve 430 is in alignment with the orifice 424a and the orifice 434 is in alignment with the orifice 426a. During vehicle rebounding motion, i.e., in the piston compression stroke, the fluid flows from the upper fluid chamber 316 to the lower fluid chamber 318 through the orifice 426a. On the other hand, during vehicle bounding motion, the fluid flows from the lower fluid chamber 318 to the upper fluid chamber 316 through orifices 424a and 426a. Since the first orifices 424a and 426a are the narrowest, the damping force produced in this mode is the highest among the three selectable modes.

In case of the MEDIUM mode, the orifices 432 and 434 of the rotary valve member 430 are respectively in alignment with the second orifices 424b and 426b.

In case of the SOFT mode, the orifices 432 and 434 align with the third orifices 424c and 426c, respectively to cause fluid flow. Since the third orifices 424c and 426c are the widest of the three sets, as described above, the damping force created in this SOFT mode is the lowest.

According to the shown embodiment, the electric step motor 442 is connected to the controller 100 through the driver circuit 16. Similarly to the case of the two-way shock absorber, the controller 100 selects any appropriate damping force state in accordance with detected road surface conditions but in this case produces a three-way control signal for actuating the shock absorber to one of the SOFT, MEDIUM and HARD modes. The driver circuit 16 is responsive to the control signal to drive the step motor 442 to operate the rotary valve member 430 to the corresponding valve position.

As an alternative to the modification set forth above, only SOFT and MEDIUM modes may be used for road-condition-dependent suspension control. Therefore, when the HARD mode is selected in the foregoing first embodiment set forth above the controller 100 actuates the shock absorber to MEDIUM mode.

FIGS. 12 to 14 show the structuure of a roll stabilizer 530 to be controller by the first or second embodiment of the suspension control system as set forth above. The roll stabilizer 530 comprises a transverse bar section 532 and a pair of parallel bar sections 534 and 536. The transverse bar section 532 extends essentially perpendicular to the vehicle axis and has a circular cross-section. The transverse bar section 532 is connected to hollow cylindrical bearing sections 538 and 540 at both ends. The parallel bar sections 534 and 536 have end segments 542 and 544 of circular cross-section adapted to rotatably engage the bearings 538 and 540 of the transverse bar section 532. The parallel bar sections 534 and 536 also have rectangular cross-section major sections 546 and 548, each of which has one end 550 and 552 connected to a suspension arm 551 through a connecting rod 553 which allows free rotation of the associated bar 534 and 536.

The cylindrical cross-section end segments 542 and 544 of the parallel bar sections 534 and 536 extend beyond the ends of the bearing portion 538 and 540. Link plates 554 and 556 are rigidly fitted onto the protruding ends of the parallel bar sections 534 and 536. The link plates 554 and 556 are rotatable about the bearing sections 538 and 540 together with the parallel bar sections 534 and 536. The link plates are connected to each other through a linkage 558. In addition, the link plate 554 is associated with an actuator 560 through an actuation rod 562 engaging an elongated opening 564 of the link plate 554. The actuator 560 may comprise an electro-magnetically operative solenoid. The actuator is adapted to be energized by a control signal fed from a controller 100 to rotate the link plate 554 along with the parallel bar section 534 through 90° from the shown neutral position. When the actuator 560 is energized, the link plate 556 is also rotated according to rotation of the link plate 554 to pivot the parallel bar 536 through 90° within the bearing section 540.

As shown in FIG. 14, at the neutral position, the parallel bar sections 534 and 536 lie with their wider sides 534w (536w) horizontal. In this position, since the resistance of the parallel bar sections 534 and 536 to the vertical bending moment applied when the vehicle wheel bounds or rebounds is relatively small, the torsion on the transverse bar section 532 of the stabilizer 530 is small. When the actuator 560 is energized, the parallel bar sections 534 and 536 are rotated to lie with their shorter sides 534s (536s) horizontal, as shown in phantom line in FIG. 12. In this position, the bending stress on the parallel bar sections 534 and 536 is increased, i.e., the torsion on the transverse bar section 532 of the stabilizer is increase.

In this embodiment, the roll-stabilizer 30 is normally arranged so that the wider sides 534W and 536W of the parallel bar sections 534 and 536 lie horizontal. As set forth above, since the resistance of the parallel bar sections 534 and 536 to bounding and rebounding of the vehicle wheel is relatively weak in this position, the stiffness of the suspension remains low to provide good riding comfort. This roll-stabilizer 530 is held in this position as long as the road surface condition indicative signal value remains less than the threshold value which is also derived in accordance with the vehicle speed.

When the steering angle change matches or exceeds the threshold value, the actuator 560 is energized to rotate the parallel bar sections 534 and 536 through 90° to align the shorter sides 534S and 536S horizontally. As a result, a greater resistance is exerted against bounding and rebounding of the vehicle wheel to successfully suppress rolling motion of the vehicle body.

Therefore, controlling the stiffness of the roll-stabilizer set forth above can also achieve roll-suppressive suspension control comparable to that of the first embodiment.

FIG. 15 shows another arrangement of the automotive suspension system to which the control system according to the present invention is applicable. In the shown system, an expandable and contractable pneumatic chamber 600 is formed above the shock absorber 14. The pneumatic chamber 600 is connected to a pressurized pneumatic fluid source 602. The fluid source 602 comprises a compressor 604 for pressurizing a fluid such as air, a reservoir tank 606 connected to the compressor 604 through an induction valve 608, and a pressure coontrol valve 610. The pressure control valve 610 connected to the driver circuit 16 to be controlled thereby. In the induction mode, the fluid reservoir 606 is connected to the compressor 604 to receive the pressurized fluid. On the other hand, the fluid reservoir 606 is open to atmosphere to decrease the fluid pressure in the ventilation mode of the induction valve.

The pressure control valve 610 is co-operative with the induction valve 608 to adjust the fluid pressure in the pneumatic chamber 600 in accordance with vehicle driving conditions.

According to the shown embodiment, the driver circuit 16 may be connected to the control system of any of the first embodiment so that it is activated in response to road roughness. When energized by the driver circuit, the pressure control valve 610 closes to block pneumatic fluid communication between the pneumatic chamber 600 and the fluid reservoir 606. As a result, the effective volume of the pneumatic chamber 600 corresponds to that of the pneumatic chamber. Since the damping characteristics due to the pneumatic pressure in the pneumatic chamber is related to the effective volume of the pneumatic chamber and a smaller volume is achieved by blocking fluid communication between the pneumatic chamber and the fluid reservoir, the pneumatic chamber becomes relatively rigid in this case, providing a larger damping force in response to the rough road which causes relatively low-frequency of vibration on the vehicle body as detected by the manner as set out with respect to the first embodiment.

On the other hand, in the normal valve position, the pressure control valve 610 opens to establish fluid communication between the pneumatic chamber and the fluid reservoir. As a result, the effective volume becomes equal to the sum of the volumes of the pneumatic chamber and the fluid reservoir. By providing a larger effective volume, damping characteristics of the pneumatic chamber are weakened.

The above-mentioned suspension system structure of FIG. 15 has been disclosed in U.S. Pat. No. 4,349,077 to Sekiguchi et al and U.S. Pat. No. 4,327,936 to Sekiguchi. In addition, a similar system has been disclosed in the co-pending U.S. patent application Ser. No. 573,504, filed on Jan. 24, 1984, which corresponds to the co-pending European Patent Application No. 84100729.7, filed on Jan. 24, 1984. The contents of the above-identified U.S. Patents and the co-pending applications are hereby incorporated by reference.

Road surface condition dependent suspension control can also be achieved with this suspension system. When road roughness requires harder suspension, the pressure control valve 610 is closed to block fluid communication between the pneumatic chamber 600 and the reservoir in order to increase the stiffness of the strut assembly and so produce a greater damping force with which to suppress vibration of the vehicle body. On the other hand, on relatively smooth road surface conditions, the pressure control valve 610 remains open, allowing fluid communication between the pneumatic chamber and the reservoir chamber. As a result, sufficiently soft-shock-absorbing characteristics can be provided to ensure good riding comfort.

As set forth above, according to the present invention, the vehicular suspension system can provide both riding comfort and good drivability by controlling hardness of the suspension depending upon the road surface conditions.

It should be noted that although the shown embodiments control the damping force and/or rigidity of the suspension system by adjusting the damping characteristics of the suspension strut assemblies, it would also be possible to perform suspension control by adjusting the rigidity of a roll-stabilizer employed in the vehicle suspension. Such variable spring-force or damping-force stabilizers for vehicle suspension systems have been illustrated in the co-pending U.S. patent application Ser. No. 647,648, filed Sept. 6, 1984. The contents of the above-identified co-pending U.S. patent application are hereby incorporated by reference for the sake of disclosure.

What is claimed is:

1. A suspension control system for a vehicle comprising:
    a vehicular suspension system with variable damping characteristics, operable in at least a first mode wherein a relatively low damping characteristic is obtained and a second mode wherein a relatively high damping characteristic is obtained;
    a road sensor monitoring road surface conditions and producing a road condition indicative signal;
    a controller selecting an appropriate operation mode of said suspension system on the basis of said road condition indicative signal and producing control signals ordering said suspension system to operate in the selected mode, said controller being responsive to a road condition indicative signal value exceeding a first predetermined threshold value to output a control signal ordering said suspension system to said second mode, said controller detecting when said road condition indicative signal value exceeds a second predetermined threshold which is smaller than said first predetermined threshold and outputting a control signal ordering said suspension system to said second mode when the frequency of occurrence of said road condition indicative signal values in excess of said second predetermined threshold exceeds a given frequency threshold.

2. The suspension control system as set forth in claim 1, wherein said controller holds said suspension system in said second mode for a first given period after ordering said suspension system into said second mode in response to a road condition indicative signal value exceeding said first predetermined value, and for a second given period after ordering said suspension system into said second mode in response to a rate of occurence of said road condition indicative signal values in excess of said second predetermined threshold exceeding said given frequency threshold.

3. The suspension control system as set forth in claim 2, wherein said controller restarts said second period whenever a road condition indicative signal value exceeds said second predetermined threshold.

4. The suspension control system as set forth in claim 1, wherein the value of said first predetermined threshold reflects bottoming of the suspension system of the vehicle due to passage over a bump in the road.

5. The suspension control system as set forth in claim 4, wherein the value of said second predetermined threshold reflects an irregularity in the road surface which might cause uncomfortable pitching motion of the vehicle.

6. The suspension control system as set forth in claim 5, wherein said suspension comprises a hydraulic shock absorber with damping characteristics variable between at least said first mode and said second mode.

7. The suspension control system as set forth in claim 6, wherein said hydraulic shock absorber has upper and lower fluid chambers, each filled with a working fluid and variable in volume according to relative vertical displacement between the road surface and the vehicle, said shock absorber being provided with a flow control valve variable between a first mode position in which flow of working fluid between said upper and lower fluid chambers through a flow path is limitted to a minimum rate, and a second mode position for allowing fluid flow through said flow path at a maximum rate.

8. The suspension control system as set forth in claim 5, wherein said suspension comprises a stabilizer, the stiffness of which is variable between at least said first mode and said second mode.

9. The suspension control system as set forth in claim 5, wherein said suspension comprises a pneumatic spring means exerting a pneumatic damping force on the suspension variable between at least said first mode and said second mode.

10. The suspension control system as set forth in claim 5, wherein said road sensor comprises an ultrasonic sensor transmitting ultra-sonic waves toward the road surface and receiving ultra-sonic waves reflected by the road surface and monitoring the intervals between transmission of ultra-sonic waves and reception of reflected waves for use in deriving the vehicle level relative to the road surface.

11. A method for controlling damping characteristics of a vehicular suspension system with damping characteristics variable between at least a first harder suspension mode and a second softer suspension mode according to a preselected suspension control parameter, comprising the steps of:
    monitoring road surface conditions and producing a road surface indicative signal;
    detecting first road surface conditions in which irregularities of the road surface exceed a predetermined criterion;
    detecting second road surface conditions in which the road surface undulates to an extent capable of causing uncomfortable pitching motion of the vehicle; and
    operating said suspension system in said first mode when one of said first and second road surface conditions is detected.

12. The method as set forth in claim 11, which further comprises steps of holding said suspension system in said first mode for a first given period in response to said first road surface conditions, and holding said suspension system in said first mode for a second given period in response to said second road surface conditions.

13. The method as set forth in claim 12, which further comprises the step of renewing said second period in response to each subsequent occurrence of said second road surface conditions.

14. The method as set forth in claim 13, wherein said predetermined criterion is selected so as to reflect bottoming of the suspension system of the vehicle due to passage over a bump in the road.

15. The method as set forth in claim 13, wherein said second road surface conditions reflect irregularities in the road surface which could cause uncomfortable pitching motion of the vehicle.

* * * * *